Patented June 9, 1936

2,043,836

UNITED STATES PATENT OFFICE 2,043,836

MINERAL OIL COMPOSITION

Robert C. Moran, Wenonah, N. J., assignor to Socony-Vacuum Oil Company, Incorporated, New York, N. Y., a corporation of New York No Drawing. Application November 29, 1933, Serial No. 700,372

3 Claims. (Cl. 87—9)

The present invention resides in the discovery that particularly effective pour-point depressants, for oils containing waxy materials, may be produced by the reaction, in the presence of an active metal halide such an anhydrous aluminum chloride, between oleic acid, an alkyl dichloride, and any of the unsubstituted aromatic hydrocarbons.

In an application for Letters Patent of the United States, filed May 27, 1933, Serial No. 673,310, by the present applicant and another, the fact is disclosed that an effective pour-point depressant may be made by the reaction, in the presence of anhydrous aluminum chloride, between naphthalene and oleic acid. In conducting that reaction it is necessary to use a solvent for the naphthalene, for which purpose I proposed the use of an inert solvent, such as naphtha which has been rendered inactive by previous treatment with aluminum chloride. In accordance with the present invention, an alkyl dichloride, such as ethylene dichloride or propylene dichloride, is used instead of an inert solvent, and I have discovered that the reaction so conducted results in a material having a substantially greater effect in depressing the pour-point of a wax-containing lubricating oil. In place of naphthalene, either benzene or anthracene may be used, and in each case the product is more effective than that produced, from the corresponding aromatic hydrocarbon, with the use of an inert solvent. In the case of benzene no solvent, as such, is necessary, but the alkyl dichloride is used by reason of its reaction with the other materials.

I have not yet been able to determine the chemical constitution of the products in question, but believe that they probably have complex molecules based on stearic-acid radicals.

The production of the novel pour-point depressant from naphthalene, on a laboratory scale, may be conducted as follows:

12 grams of naphthalene are dissolved in 50 g. of oleic acid and 50 g. of ethylene dichloride. 25 g. of active aluminum chloride are suspended in 250 g. of ethylene dichloride and warmed, with constant stirring, to 75° to 85° F. The mixture containing the naphthalene is then stirred into the suspension of aluminum chloride, at a rate such that the temperature of the reaction mixture does not exceed 110° F. The mixture, when completed, is maintained at a temperature between 110° F. and 120° F. for one hour, with constant stirring. At the end of this period the reaction is substantially completed, and the mixture has become so viscous as to be stirred only with difficulty.

The reaction mixture is then added to 250 ml. of 15% hydrochloric acid and agitated until the complex with the aluminum chloride has been decomposed. The contents of the vessel will then separate, by gravity, into an upper oily layer, containing the desired product, and a lower watery layer containing the aluminum in solution. The upper layer is washed free of hydrochloric acid, and distilled to remove the remaining ethylene dichloride. The distillation residue, consisting of or containing the pour-point depressant, amounts to about 62 g. Most of the ethylene dichloride is recovered since the quantity used is determined by its function as a solvent rather than as a reagent.

Where benzene is used in place of naphthalene, 7 g. of benzene and 200 g. of ethylene dichloride are used, but the process is otherwise the same. In the case of anthracene, 10 g. are used and the process is otherwise the same as in the case of naphthalene, except that a higher reaction temperature—155° to 165° F.—is necessary, and that unreacted anthracene may remain in the product and require separation by filtration.

In place of ethylene dichloride, propylene dichloride, in the same quantity, may be used in each case, but the products are slightly less effective as pour-point depressants.

Materials produced in the manner described are effective in reducing the pour point of wax-containing lubricating oil, when added in amounts of the order 0.5% or less of the weight of the oil. In the case of an ordinary lubricating oil, partially dewaxed in the usual manner and having a Saybolt universal viscosity of 50 seconds at 210° F., and a pour point of 30° F., the addition of 0.5% of the reaction product of naphthalene, oleic acid and ethylene dichloride lowered the pour point by 45 degrees. The corresponding products of benzene and of anthracene, when used in the same amount, lowered the pour point by 15 degrees and 10 degrees, respectively. The product from naphthalene is, in general, substantially more effective than the others.

Where propylene dichloride is used in place of ethylene dichloride, the product is somewhat less effective. In the case of the oil above described, 0.5% of the reaction product of naphthalene, oleic acid and propylene dichloride lowered the pour point by 35 degrees.

As in the case of all pour-point depressants known to me, the efficacy of my materials varies with the characteristics of the oil with which they are used, being greater in proportion to the wax content of the oil, and less in proportion to the viscosity of the oil.

Although I am unable to specify the chemical constitution of the materials herein referred to, and have therefore described them as the products of a particular process, my invention is not limited to the use of such process but embraces the use of these materials in the composition of lubricating oils, however the materials may be produced.

Although I have described my process as conducted with the use of aluminum chloride as the active metal halide or catalyst, it will be understood that any of the metal halides may be used which are known to be active in promoting similar condensing reactions.

I claim as my invention:

1. An oil composition comprising a wax-containing oil, and a relatively small quantity of the oily material constituting the principal product of the reaction of oleic acid, an alkyl dichloride and an unsubstituted aromatic hydrocarbon in the presence of active aluminum chloride.

2. An oil composition comprising a wax-containing oil, and a quantity, sufficient to depress substantially the pour point of said oil, of the oily material constituting the principal product of the reaction of oleic acid, naphthalene and the dichloride of ethylene or propylene, in the presence of active aluminum chloride.

3. A pour-point depressant consisting of the oily product of the reaction of oleic acid, an unsubstituted aromatic hydrocarbon and the dichloride of ethylene or propylene, in the presence of an active metal halide.

ROBERT C. MORAN.